United States Patent
Hazzard et al.

(10) Patent No.: US 12,553,943 B2
(45) Date of Patent: Feb. 17, 2026

(54) MULTI-INPUT REMOTE HEADS FOR SEQUENTIAL TESTING

(71) Applicant: Tektronix, Inc., Beaverton, OR (US)

(72) Inventors: Shane A. Hazzard, Portland, OR (US); Ajaiey Kumar Sharma, Everett, WA (US); Timothy E. Bieber, Portland, OR (US); John Marrinan, Dublin (IE); Andrew McCann, Portland, OR (US); Pieter Christiaan Seidel, Pendergrass, GA (US); Josiah A. Bartlett, Forest Grove, OR (US)

(73) Assignee: TEKTRONIX, INC., Beaverton, OR (US)

( * ) Notice: Subject to any disclaimer, the term of this patent is extended or adjusted under 35 U.S.C. 154(b) by 296 days.

(21) Appl. No.: 17/832,535

(22) Filed: Jun. 3, 2022

(65) Prior Publication Data

US 2022/0390513 A1    Dec. 8, 2022

Related U.S. Application Data

(60) Provisional application No. 63/196,430, filed on Jun. 3, 2021.

(51) Int. Cl.
*G01R 31/317*    (2006.01)

(52) U.S. Cl.
CPC .............. *G01R 31/31723* (2013.01)

(58) Field of Classification Search
CPC .................................................. G01R 31/31723
See application file for complete search history.

(56) References Cited

U.S. PATENT DOCUMENTS

| 5,418,470 A | 5/1995 | Dagostino et al. |
| 5,625,299 A | 4/1997 | Uhling |

(Continued)

FOREIGN PATENT DOCUMENTS

GB    2226644 A   *  7/1990 ............ G11C 29/28

OTHER PUBLICATIONS

Korean Intellectual Property Office, International Search Report and Written Opinion for International Application PCT/US2022/032264, Oct. 4, 2022, 11 pages, Daejeon, Republic of Korea.

(Continued)

*Primary Examiner* — Feba Pothen
(74) *Attorney, Agent, or Firm* — Miller Nash LLP; Andrew J. Harrington

(57) ABSTRACT

An input selector for electrically connecting one of a plurality of test signals from a device under test to a test and measurement instrument includes a multiplexer having multiple inputs, each of the multiple inputs coupled to a different one of the plurality of test signals from the device under test, and having an output of a selected one of the multiple inputs, and an amplifier coupled to the output of the multiplexer for amplifying the selected test signal of the device under test before being sent as an output of the input selector to the test and measurement instrument. In alternative architectures, two or more amplifiers are coupled to the plurality of test signals, and the multiplexer selects an output of one of the two amplifiers to pass to a measurement instrument for testing.

19 Claims, 3 Drawing Sheets

(56) References Cited

U.S. PATENT DOCUMENTS

| | | | |
|---|---|---|---|
| 6,532,557 B1* | 3/2003 | Wong | G01R 31/3181 |
| | | | 714/724 |
| 6,703,825 B1 | 3/2004 | Creek et al. | |
| 9,863,988 B1 | 1/2018 | Seguine | |
| 2002/0113591 A1* | 8/2002 | Hinks | G01R 33/28 |
| | | | 324/309 |
| 2004/0059437 A1* | 3/2004 | Cullen | G01R 31/31921 |
| | | | 700/5 |
| 2006/0252419 A1 | 11/2006 | Liu | |
| 2010/0220874 A1 | 9/2010 | Sakai et al. | |
| 2012/0126792 A1* | 5/2012 | Groves | G01R 27/28 |
| | | | 324/140 R |
| 2014/0103907 A1* | 4/2014 | Muecke | G01R 35/005 |
| | | | 324/130 |
| 2015/0184991 A1* | 7/2015 | Nakabayashi | G06F 3/0446 |
| | | | 345/174 |
| 2015/0285892 A1 | 10/2015 | Muecke | |
| 2015/0304864 A1 | 10/2015 | Olgaard | |
| 2017/0108533 A1 | 4/2017 | Ohmart | |
| 2018/0026816 A1* | 1/2018 | Pickerd | H04L 25/03828 |
| | | | 375/232 |
| 2019/0113561 A1 | 4/2019 | Yogeeswaran | |
| 2020/0284822 A1 | 9/2020 | Whittington | |
| 2022/0034967 A1 | 2/2022 | Tektronix | |

OTHER PUBLICATIONS

Tektronix, Inc, TriMode Probe Family: P7500 Series Datasheet, 11 pages, Web Page <https://www.tek.com/en/datasheet/trimode(tm)-probe-family-0>, retrieved electronically on Jun. 7, 2022.

* cited by examiner

MULTI-INPUT REMOTE HEADS FOR SEQUENTIAL TESTING

CROSS REFERENCE TO RELATED APPLICATIONS

This disclosure claims benefit of U.S. Provisional Application No. 63/196,430, titled "MULTI-INPUT REMOTE HEADS FOR SEQUENTIAL TESTING," filed on Jun. 3, 2021, which is incorporated herein by reference in its entirety. This disclosure is also related to U.S. patent application Ser. No. 17/375,451, filed on Jul. 14, 2021, titled MULTIPLEXER-ENABLED CABLES AND TEST FIXTURES, which is also incorporated by reference herein.

TECHNICAL FIELD

This disclosure is directed to systems and methods related to test and measurement systems, and in particular, to test and measurement systems for measuring multiple signals from a device under test (DUT).

BACKGROUND

Many DUTs includes a multitude of similarly designed signal paths. For example, a Peripheral Component Interconnect (PCI) Express (PCIe or PCI-e) plug-in card and/or a PCIe motherboard slot commonly include up to sixteen electrical signal "lanes." The electrical signal lanes are typically differential signal lanes, meaning that one differential lane requires two electrical measurement ports to fully measure the differential signal of the lane. Thus, to fully measure a sixteen lane PCIe device would require 32 electrical measurement ports. However, test and measurement instruments typically used to test such DUTs, such as oscilloscopes or bit error rate testers (BERTs), typically have one, two, or four input ports. Although some oscilloscopes include eight input channels or ports, high performance instruments typically have fewer input channels due to the increased hardware costs associated with each channel. Physical channel density limitations also can keep channel count low for thermal and throughput reasons. For this reason, it is typical that a test and measurement instrument configuration will be connected to only a subset of the electrical signal lanes to be tested.

Since only a subset of lanes are coupled to the measurement instrument, if a user wishes to test all of the signal lanes, the user must manually move a connection between the test and measurement instrument and the DUT, e.g., a test cable or probe, from each lane to lane manually. Manually moving the cable or probe is an error-prone and very time and labor-intensive process. Alternatively, such as in a two-channel test and measurement environment, a radio frequency (RF) switch can be built and maintained to allow for automation for testing all signal lanes of the DUT. However, identifying a suitable switch and correctly de-embedding the impact of the switch from the signal path, which is performed manually, are difficult at higher frequencies. Because of this, many users do not trust the switches can be de-embedded without significant errors, especially above 25 GHz. In addition, an RF switch matrix is physically large, which makes the RF switch matrix solution particularly unattractive to users having limited physical area for testing.

Examples of the disclosure address these and other deficiencies of the prior art.

BRIEF DESCRIPTION OF THE DRAWINGS

Aspects, features and advantages of examples of the present disclosure will become apparent from the following description of examples in reference to the appended drawings in which.

DESCRIPTION

Figure 1:
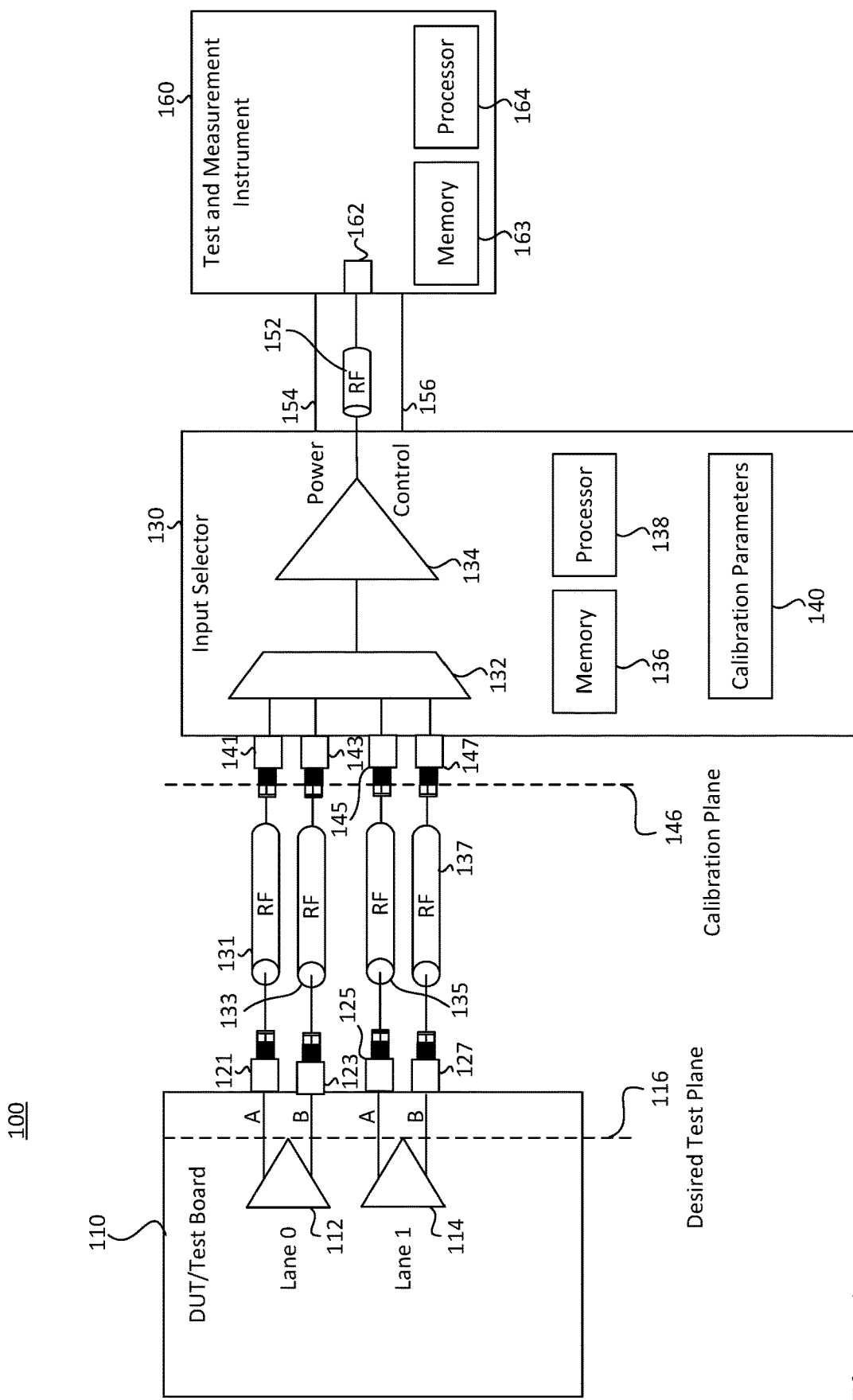
FIG. 1 is a block diagram of an input selector in a test and measurement system including an active amplifier, according to some examples of the disclosure.

FIG. 1 illustrates an example block diagram of a test and measurement system 100 according to some examples of the disclosure. The test and measurement system 100 includes a device under test (DUT) 110, which may be a test board, connected to a test and measurement instrument 160 through a cable or test fixture having a selectable input, which is referred to herein as an input selector 130. The input selector 130 includes a multiplexer 132, which may also be referred to as a data selector, as well as an amplifier 134 for amplifying a selected signal before transmitting it to the measurement instrument 160. Including the amplifier 134 as close to the selected signal as possible increases the signal-to-noise ratio of the selected signal in the testing system 100, compared to conventional systems, by selectively amplifying the selected signal as close to the source as possible. The multiplexer 132 has multiple inputs, each coupled to one of the outputs of the DUT 110, and has a single output, which is fed to the amplifier 134. The many-to-one or many-to-few function of the multiplexer 132 allows the user to select any of the desired signals from the DUT 110 for testing, while minimizing the number of cables connected between the measurement instrument 160 and the DUT 110. In some embodiments, the outputs of the RF connectors 141-147 are not connected directly to the inputs of the multiplexer 132, but rather pass into an attenuator or buffer to modify the signal prior to being presented to the input of the multiplexer 132. As described below, the user may control the multiplexer 132 manually, such as through a user interface, or programmatically, such as using program scripts that operate in the testing system 100. Additional benefits of the test system 100, such as shifting a signal calibration plane 146 closer to the DUT 110, are described below. Although illustrated in FIG. 1 as only having a single output, the multiplexer 132 may include multiple outputs, especially when there are multiple inputs to the multiplexer from the DUT 110, such as eight, sixteen, thirty-two, or more inputs. Having multiple outputs of the multiplexer 132 increases the throughput of the testing of the DUT 110. In some embodiments the multiplexer 132 may include anywhere between one and eight outputs. Typically, each of these outputs is amplified through its own amplifier 134, before being coupled to a testing port of the measurement instrument 160.

The DUT 110 can include multiple signal lanes. In the system illustrated in FIG. 1, the DUT 110 includes two lanes, Lane 0 and Lane 1, which are coupled to output amplifiers 112, 114, respectively. In the illustrated embodiment, each individual lane includes two signals, A and B, which are differential signals, meaning the output signal for each lane is transmitted as the difference between the signals A and B of the lane. As illustrated in FIG. 1, all of the four outputs of the DUT 110 are individually coupled to the input selector 130, and specifically each of the outputs of the DUT 110 are coupled to a separate input to the multiplexer 132 so that any of the individual outputs may be selected for testing by controlling the multiplexer 132. In particular, Lane 0, signal A is coupled from an RF connector 121 on the DUT 110 through an RF cable 131 to an RF connector 141 on the input selector 130. The RF cable 131 may be a coaxial cable used to minimize signal loss between the DUT 110 and the input selector, for example. Likewise, signal B from Lane 0 is coupled to the input selector 130 through an RF cable 133 between RF connectors 123 and 143, signal A from Lane 1 is coupled through an RF cable 135 between RF connectors 125 and 145, and signal B from Lane 1 is coupled through an RF cable 137 between RF connectors 127 and 147.

Although only four connections from the DUT 110 into the input selector 130, and further to the multiplexer 132 are shown, any number of connections can be included in a testing system, such as, but not limited to, eight, sixteen, or thirty-two connections. The connections between the DUT 110 may include high-density connections, i.e., eight or greater connections between the DUT 110 and the input selector 130. As mentioned above, especially in embodiments with higher numbers of connections from the DUT 110, the multiplexer 132 may include multiple outputs, and is not limited to a single output.

As will be understood by one skilled in the art, the DUT 110 may refer to a stand-alone device under test with one or more signal lanes, or may refer to a particular output component of a DUT 110 that itself has multiple signal lanes. A modern PCIe device, for example, may include sixteen lanes, each having a differential signal pair A and B. Embodiments according to this disclosure provide the user with an ability to easily select any of the signals from such a device for testing while also eliminating the noise that is inevitably added by using one or more cascaded RF switches, as in present systems.

The multiplexer 132 of the input selector 130 provides a selection function to the user. In other words, the user controls the multiplexer 132 of the input selector 130 to choose any of the four inputs to the multiplexer as the desired output of the input selector. The selected signal from the multiplexer 132 is amplified by amplifier 134 before sending it through an RF connection, such as a cable 152, to a test port 162 of the measurement instrument 160. Although in FIG. 1 the amplifier 134 includes only a single output being sent to the measurement instrument 160, in other embodiments the amplifier 134 may send more than one signal to the measurement instrument 160 for testing. For example, the amplifier 134 may be a differential amplifier that sends a differential signal over two separate paths to the measurement instrument 160. In other embodiments the input selector 130 may include multiple amplifiers 134, which each send an amplified signal to the measurement instrument 160. For example the input selector 130 may be controlled to simultaneously send the A input of both Lanes 0 and Lane 1, as separate signals routed from the multiplexer 132 through separate amplifiers 134, to the measurement instrument 160. Or, the input selector 130 may be controlled to simultaneously send both the A and B inputs of Lane 1 out of the multiplexer 132 and individual amplifiers 134, as separate signals, to the measurement instrument 160.

Depending on the DUT 110 and the test and measurement instrument 160, signals may travel both to and from each of the DUT 110 and the test and measurement instrument 160. Such signals may be used to characterize each of the paths from the DUT 110 to the measurement instrument 160, as described below.

The input selector 130 may receive power from the measurement instrument 160 over a power line 154 to power the multiplexer 132, amplifier 134, and potentially other components of the input selector. In other embodiments the input selector 130 may be coupled to a power supply separate from the measurement instrument 160, such as one directly plugged into wall power. In yet other embodiments the input selector 130 may be able to draw power from the DUT 110 without affecting the integrity of the signals of the DUT for testing. For example, a Universal Serial Bus transmits power as well as data over its lines and the input selector 130 may be able to use a small amount of power from the USB cables. In yet other embodiments, the power needs of the input selector 130 may be so small that they can be met by a battery, either rechargeable or replaceable, contained within the input selector 130. This may be possible with certain embodiments of the input selector 130, such as when the input selector 130 is embodied as an Application Specific Integrated Circuit (ASIC) or a MicroElectroMechanical System (MEMS) switch. In other embodiments the input selector 130 may include multiple discrete components mounted to a Printed Circuit (PC) board.

As described below, control signals between the measurement instrument 160 and input selector 130 may be carried on a control line 156. In some embodiments a user or operator may operate the measurement instrument 160 to select one of the signals from the DUT 110 for testing. In response, the measurement instrument 160 sends a control signal across the control line 156 to cause the input selector 130 to operate the multiplexer 132 to select the desired signal, which is then amplified by the amplifier 134 and sent to the measurement instrument 160 for testing. The user may make the selection on a user interface of the measurement instrument 160, or may instruct the instrument using programmatic controls, such as using the PI programming interface available on measurement instruments from Tektronix, Inc. of Beaverton, Oregon. For example, the user may program the measurement instrument 160 to cause a first signal from the DUT 110, for example Lane 0, signal A, to be selected for testing, and then test desired parameters of the selected signal at the measurement instrument 160 for a period of time. After the first testing period, the testing program causes the multiplexer 132 of the input selector 130 to select a second signal from the DUT 110 for testing, for example Lane 0, signal B. In this manner, all of the signals from the DUT 110 may be scripted to be tested without any necessity of the user to physically change any cables between the DUT 110 and the measurement instrument 160. Instead, the switching to connect the desired signal of the DUT 110 to the measurement instrument 160 is performed by controlling the multiplexer 132 of the input selector 130.

In FIG. 1, the connection to the test port 162, power line 154 and control line 156 may be included in a probe interface to the measurement instrument 160. Also, in some embodiments, the power line 154 and control line 156 may be embodied in a single connection, i.e., one that sends both power and control signals over the same line.

In some examples, the input selector 130 may include a memory 136 and/or a controller or processor 138. The input selector 130 may be tested during manufacturing or at the factory to measure the effects of including the input selector 130 in the testing system 100 compared to connecting a particular output of the DUT 110 directly to the test port 162 of the measurement instrument 160. Compensating for any negative effects of including the input selector 130, its components including the multiplexer 132 and amplifier 134, and its related cables 131, 133, 135, 137, and 152 is referred to as de-embedding or calibrating. The term calibration parameters in this disclosure refers to any calibration parameter, including de-embed parameters of the input selector 130, that are used to remove effects or impacts of the presence of the input selector 130 and its related cables 131, 133, 135, 137, and 152 in the testing system 100 from any signal measurements made by the test and measurement instrument 160. The calibration parameters may be stored in a particularized calibration parameters memory 140 or in the general memory 136 and sent to the test and measurement instrument 160 during a testing session. In some examples, the calibration parameters may be sent to an analysis device that is remote from the test and measurement instrument 160. The analysis device may collect the calibration parameters as well as data from the test and measurement instrument 160 and provide any processing needed of the data, as will be understood by one skilled in the art. In other examples, the calibration parameters for a particular input selector 130 may be stored in a memory 163 located in the test and measurement instrument 160 or retrieved from remote storage, such as cloud storage and sent to the input selector 130 to be stored in its calibration parameters storage 140. The particular calibration parameters used to de-embed the effects of the input selector 130 may be identified based on a serial number or other identification number of the input selector 130, for example.

Scattering parameters, also referred to as S-parameters, for each of the ports of the multiplexer 132 may be stored along with the calibration parameters 140 or in the separate memory 136 to assist the test and measurement instrument 160 in de-embedding the input selector 130 from the signal of the DUT 110. The through path and isolation path S-parameters are stored for each of the connectors 141, 143, 145, 147 of the multiplexer 132 as well as the port 162 of the measurement instrument 160. In some examples, a user may upload or otherwise port their own S-parameters, such as if the user wishes to change the S-parameters or add stress to the system.

Amplifier 134 may be an active amplifier having a low impedance input, such as 50 Ohms, which is compatible for testing many serial data DUTs 110, such as PCIe devices, Serial ATA (AT Attachment) busses, Mobile Industry Processor Interface (MIPI) interfaces, Fibre Channel, and High-Definition Multimedia Interface (HDMI) interfaces, for example. In other embodiments the amplifier 134 may include or use a buffer to buffer signals from the DUT 110 for testing. In these embodiments the amplifier 134 typically has a relatively high input impedance, such as 100 kOhm or 150 kOhm differential DC input resistance. An input selector 130 having this relatively high input impedance is useful for testing memory circuits, as well as high speed serial busses, for example. In either the case of a low impedance input amplifier 134 or a high impedance input amplifier 134, including the amplifier 134 in the input selector allows the selected signal from the output of the multiplexer 132 to be amplified as close to the selected source as possible and in a manner that maximizes its signal transfer characteristics to the measurement instrument 160. Not only does this placement of the amplifier 134 within the input selector 130 decrease noise interference, the use of the calibration parameters 140 within the input selector 130 allows a calibration plane 146 to be closer to a desired test plane 116 of the DUT 110. The calibration plane 146 is the theoretical plane to which the input selector 130 has been compensated and calibrated, as described above, to remove the effects of the input selector 130 as much as possible. The desired test plane 116 is the theoretical plane of the DUT 110 at which the use wishes to test. In the embodiment illustrated in FIG. 1, the desired test plane 116 is the plane at the output of the amplifiers 112, 114. The components between these two test planes 116, 146, i.e., the connectors 121-127, cables 131-137, and connectors 141-147 are also all chosen to minimize any influence on the signals received from the DUT 110. Therefore, including the amplifier 134 in the input selector 130 that further includes compensation and calibration parameters 140 provides the best possible testing environment, that is, the one that provides for the most accurate measurement of the signals from the DUT 110 while still providing the ability to switch which of the many possible outputs of the DUT 110 is coupled to the measurement instrument 160 for testing.

As shown in the diagrams, users may desire a calibration plane at a certain location in the DUT 110 that may not be physically accessible. For example, as illustrated in FIG. 1, some users may wish to view and analyze a waveform as it would appear inside of a particular device within the DUT 110. It is possible to "position" the theoretical test plane 116 at a desired location through mathematical analysis of acquired waveforms, simplified by applications such as Serial Data Link Analysis (SDLA). Required information to enable this analysis includes S-parameters of concatenated blocks in the signal path. Determining those S-parameters is difficult, requires special equipment and expertise, and is error prone. Adding in a complex signal path, including off-the-shelf RF switches, exacerbates the problem of determining and using the S-parameters. Embodiments of this disclosure, however, pre-analyze the effect of including the input selector 130 in the testing system 100 and store the calibration parameters, including the S-parameters, in the calibration parameters memory 140, which may then be sent to or retrieved by the measurement instrument 160 before or coincident with using the testing system 100. This determination of the calibration parameters, and storage of same in the input selector 130, at the time of manufacture significantly reduces or eliminates the burden of end users needing to determine the calibration parameters themselves, which, as described above, are difficult to accurately determine.

As mentioned above, in some examples, the input selector 130 may include a processor 138. The processor 138 can operate the multiplexer 132 to connect various lanes of the DUT 110 to the test and measurement instrument 160. In other examples, a processor 164 of the test and measurement instrument 160 can send control signals to the multiplexer 132 of the input selector 130 to connect various lanes of the DUT 110 to the test and measurement instrument 160.

Figure 2:
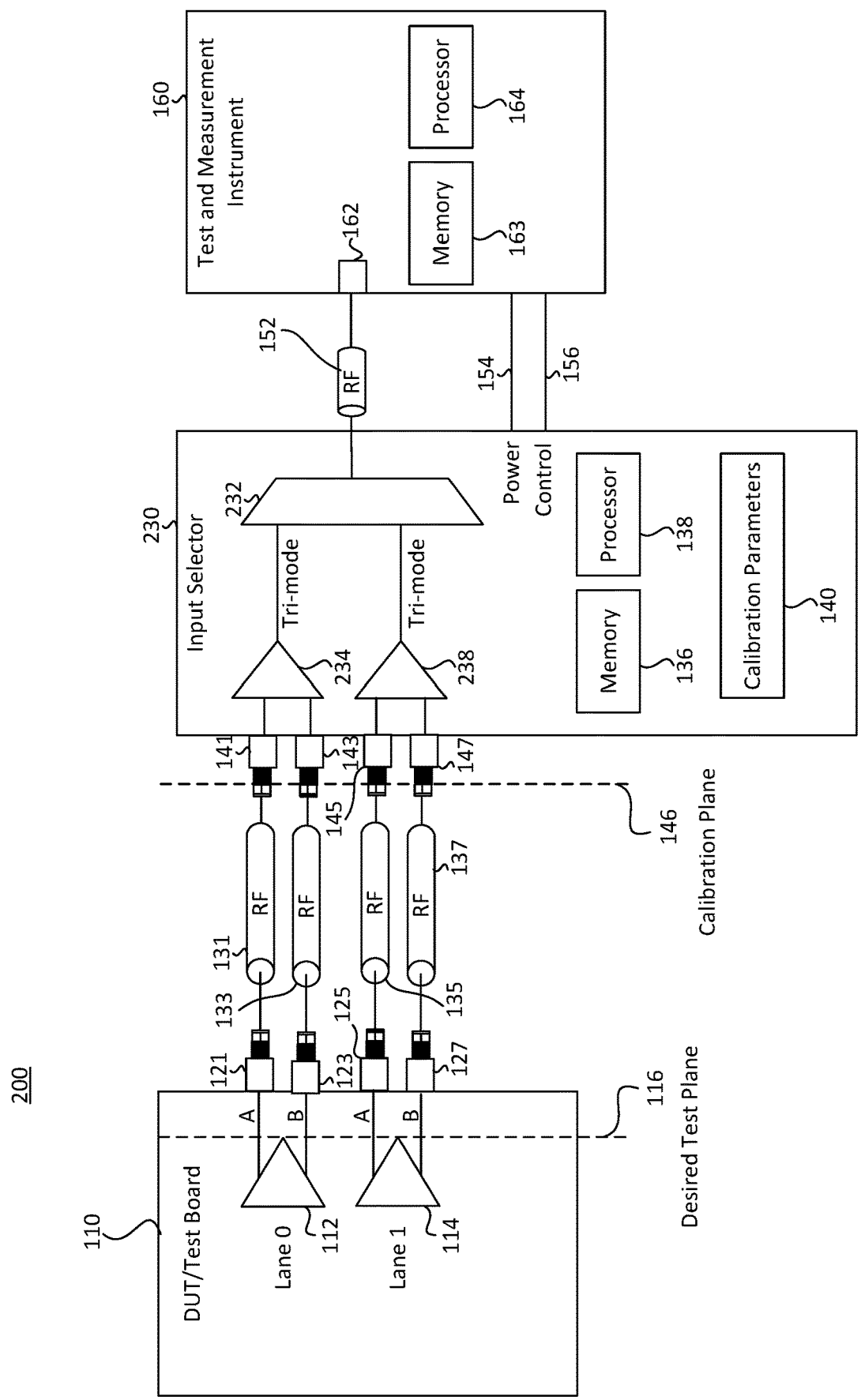
FIG. 2 is a block diagram of an input selector in a test and measurement system including active amplifiers having multiple modes, according to some examples of the disclosure.

FIG. 2 illustrates an alternative test and measurement system 200 according to some examples of the disclosure. In this example, many features of the test and measurement system 200 are the same or similar to the test system 100 discussed above with respect to FIG. 1. Accordingly, these features have the same reference numbers and are not discussed further herein with respect to FIG. 2.

Differently than the input selector 130, in an input selector 230, the inputs from the DUT 110 are coupled to amplifiers prior to being coupled to a multiplexer. In some embodiments the amplifiers are tri-mode input amplifiers 234, 238. Output from the tri-mode input amplifiers 234, 238 are coupled to the multiplexer 232, which outputs a selected signal through an RF cable 152 to the testing port 162 of the measurement instrument 160. Although only two lanes are illustrated as being connected between the DUT 110 and the input selector 230, the input selector may include hardware to connect to any number of signal paths from the DUT 110, such as four, eight, sixteen, or thirty-two. Such numbers of paths are common for memory testing or component testing such as PCIe devices. Also, as described above, although illustrated in FIG. 2 as only having a single output, the multiplexer 232 may include multiple outputs, especially when there are multiple inputs to the multiplexer from the DUT 110, such as eight, sixteen, thirty-two, or more inputs. Increasing the number of outputs of the multiplexer 232 has the effect of increasing the bandwidth, and therefore the testing speed, of the test and measurement system 200.

The tri-mode amplifiers 234, 238 operate in one of a number of modes. A user may select which modes the tri-mode input amplifiers 234, 238 are operating in as described above. In other words, the user may select an operation mode using the input selector 230, or through the measurement instrument 160, in either direct selection mode, such as by using a graphical user interface (GUI) or the PI programmatic interface on the measurement instrument as described above. In such an embodiment, control signals to operate the input selector 230 are produced by the measurement instrument 160 and carried on the control line 156 to control the processor 138 of the input selector 230.

Each tri-mode input amplifiers 234, 238 has an A and a B input from the same lane, e.g., Lane 0 or Lane 1. In one embodiment, the tri-mode input amplifiers 234, 238 include at least four modes of operation:

Mode 1, Differential signal mode: A-B
Mode 2, common signal mode: (A+B)/2
Mode 3, single-ended A mode: A-ground reference voltage
Mode 4, single-ended B mode: B-ground reference voltage In mode 1, the differential signal mode, the A and B inputs from the particular lane are subtracted from one another, and the differential signal is sent to the output of the amplifier. In Mode 2, the common signal mode, the A and B inputs are added to one another, and then divided by 2. The final output sent to the output of the amplifier is the common mode signal, which is the average of the A and B signals. Modes 3 and 4 output one of the particular inputs, only, either A or B relative to a ground reference voltage also provided as an input to the tri-mode input amplifier. Each of these modes is useful to a user testing a DUT 110. Output from each tri-mode input amplifier 234, 238 is coupled to the multiplexer 232. As described above, the user may control the multiplexer 232 to select which output of the DUT 110 is provided to the measurement instrument. In the embodiment illustrated in FIG. 2, selecting the tri-mode input amplifier 234 selects outputs from Lane 0, while selecting the tri-mode input amplifier 238 selects outputs from Lane 1. So, by selecting which mode a tri-mode input amplifier 234, 238 operates in, and by selecting which of the tri-mode input amplifiers 234 or 238 is selected by the multiplexer 232, the user can specify which signals will be passed to the measurement instrument 160 for testing and measuring. By controlling the operation of the tri-mode input amplifiers 234 and 238 as well as the multiplexer 232 in the input selector 230, a user may set up complete automatic testing scripts for testing all of the various modes of all of the various lanes of the DUT 110 without ever needing to disconnect or reconnect cables between the DUT 110 and the measurement instrument.

Also, as described above for FIG. 1, the calibration parameters of each of the testing paths between the DUT 110 and the measurement instrument may be calibrated at the time of manufacture of the input selector 230 and stored in the calibration parameter memory 140. One benefit of the embodiment illustrated in FIG. 2 over that of FIG. 1 is that the multiplexer 232 is fully isolated from the inputs from the DUT 110, unlike the embodiment where the multiplexer 132 is directly coupled to the inputs without first passing through buffers.

Although the multiplexer 232 is illustrated as being a part of the input selector 230, in some embodiments the multiplexer may be integrated into a compensation box, which are well known interfaces between a measurement instrument and a measurement probe or device.

Figure 3:
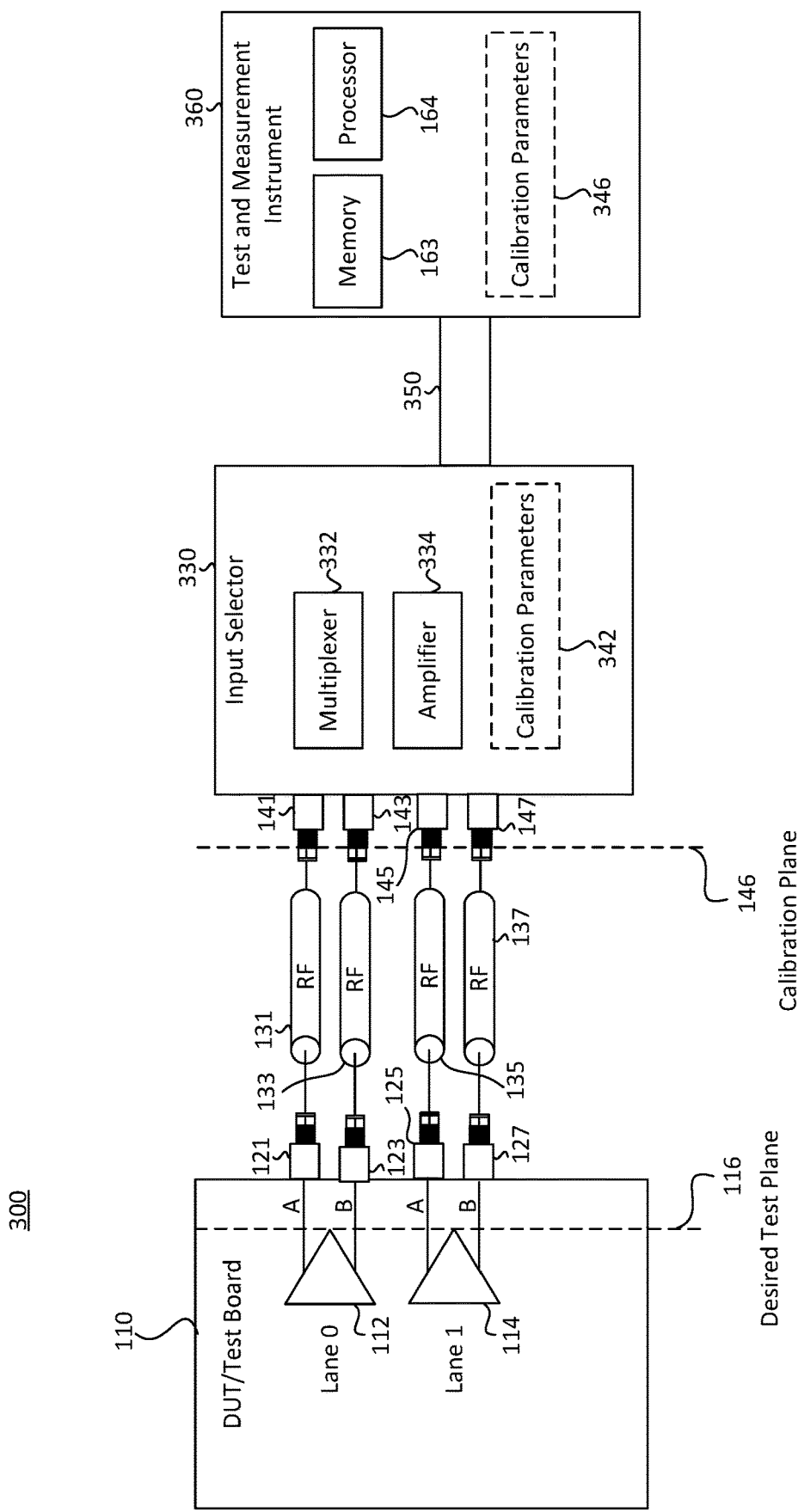
FIG. 3 is a block diagram of an input selector including an active amplifier permanently coupled to a measurement device, according to some examples of the disclosure.

FIG. 3 is a block diagram of a testing system 300 including an input selector 330 having an active amplifier in which the input selector is permanently coupled to a measurement device 360. In this example embodiment, the input selector 330 is coupled to the measurement device 360 through a permanent umbilical 350. The umbilical 350 includes connections for a power line, a control line, and one or more data interfaces to carry the data being sampled from the DUT 110 and selected by the input selector 330, as described above. Also, as mentioned above, the power line and control line within the umbilical 350 may share a common connection. This embodiment having the umbilical 350 has the best signal integrity and simplest usage, as the input selector 330 does not connect to the measurement device through any RF interface, such as with the previous examples illustrated in FIGS. 1 and 2. Such an RF interface adds noise to the testing system, which is avoided by using the permanently attached umbilical 350. In this case, the input selector 330 is permanently attached, and cannot be separated from, the measurement instrument 360. This embodiment having the umbilical 350 connection to the input selector 330 may have better testing characteristics, especially for higher frequency connections. Calibration parameters may be stored in a calibration parameter store 342 on the input selector 330, or in a calibration parameter store 346 on the measurement device 360. In some embodiments the calibration parameters are stored in both calibration parameter locations 342 and 346. Also, the input selector 330 may have the architecture of either of the embodiments described with reference to FIGS. 1 and 2, especially in regards to the relative positions of the multiplexer 332 or the amplifier 334 in the signal path.

In some embodiments the functionality of the input selector 330 may actually be integrated into the test and measurement device 360 itself. In such an embodiment the measurement device includes two or more RF switches directly coupled to the DUT 110. Outputs of the RF switches are connected to the test channels of the measurement device 360 through internal connections. Then, the user can select which channel of the DUT 110 to test by controlling the RF switches. This simplifies the RF connections for the user somewhat, as each channel being tested by the DUT 110 is connected directly to the measurement device 360. It also reduces the power requirements of the selecting function, as there is no multiplexor or amplifier to operate, and instead the switching is made within the measurement device 360.

Examples of the disclosure allow for one or more test and measurement instruments to test one or more signal lanes which may come from one or more DUTs. The input selectors of the disclosure can allow for switching between the various signal lanes to one or more test and measurement instruments. The input selectors have known calibration parameters determined at manufacturing or the factory that can be used by the test and measurement instruments to remove any effects of the selectors, their components, and their connection cables. Operation of the input selector may be programmatically controlled, and a user may program a selector to step through all of the connected signal lanes coming from a DUT without requiring any cables to be disconnected or rearranged. This can save hours of manual labor during a testing session.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the technologies disclosed herein are provided below. A configuration of the technologies may include any one or more, and any combination of, the examples described below.

Example 1 is an input selector for electrically connecting one of a plurality of test signals from a device under test to a test and measurement instrument, the input selector including a multiplexer having multiple inputs, each of the multiple inputs coupled to a different one of the plurality of test signals from the device under test, and having an output of a selected one of the multiple inputs, and an amplifier coupled to the output of the multiplexer for amplifying the selected test signal of the device under test before being sent as an output of the input selector to the test and measurement instrument.

Example 2 is an input selector according to Example 1, further comprising a memory structured to store calibration parameters of the input selector.

Example 3 is an input selector according to any of the preceding Examples, in which the amplifier is a buffered amplifier that has an input impedance over 10,000 Ohms.

Example 4 is an input selector according to any of the preceding Examples, in which the amplifier is an amplifier having an input impedance of approximately 50 Ohms.

Example 5 is an input selector according to any of the preceding Examples, further comprising a processor configured to control the multiplexer.

Example 6 is an input selector according to any of the preceding Examples, further comprising an input configured to receive a control signal to operate the multiplexer.

Example 7 is an input selector according to any of the preceding Examples, in which the control signal is generated by programmatic control.

Example 8 is an input selector according to any of the preceding Examples, in which the output of the input selector is sent over an RF cable to the test and measurement instrument.

Example 9 is an input selector according to any of the preceding Examples, in which the input selector is permanently attached to the test and measurement instrument through at least one direct signal test line.

Example 10 is an input selector according to any of the preceding Examples, in which the multiplexer has two or more outputs, and in which each of the two or more outputs is amplified before being sent as an output of the input selector to the test and measurement instrument.

Example 11 is an input selector for electrically connecting one of a plurality of test signals from a device under test to a test and measurement instrument, the input selector including a first amplifier coupled to a first lane of a device under test, the first lane having two separate signals for testing, the first amplifier having a single output, a second amplifier coupled to a second lane of the device under test, the second lane having two separate signals for testing, the second amplifier having a single output, and a multiplexer having a first input coupled to the output of the first amplifier and having a second input coupled to the output of the second amplifier, the multiplexer further having an output coupled to the test and measurement instrument.

Example 12 is an input selector according to Example 11, in which the first amplifier is operable to generate a differential output of a difference between the two separate signals of the first lane, and operable to generate a common mode output of an average of the two separate signals of the first lane.

Example 13 is an input selector according to preceding Examples 11-12, in which the first amplifier is further operable to generate an output signal of either of the two separate signals of the first lane relative to a ground reference signal.

Example 14 is an input selector according to preceding Examples 11-13, further comprising a memory structured to store calibration parameters of the input selector.

Example 15 is an input selector according to preceding Examples 11-14, further comprising a processor configured to control the multiplexer.

Example 16 is an input selector according to preceding Examples 11-15, further comprising an input configured to receive a control signal to operate the multiplexer.

Example 17 is an input selector according to Example 16, in which the control signal is generated by programmatic control.

Example 18 is an input selector according to preceding Examples 11-17, in which the multiplexer has two or more outputs, each configured to be independently coupled to the test and measurement instrument.

Example 19 is a method for connecting one or more signal lanes to a test and measurement instrument, including connecting a first signal lane from a first port to an input of a multiplexer in an input selector device, connecting a second signal lane from a second port to the input of a multiplexer in the input selector device, operating the multiplexer to select either the first signal lane of the first port or the second signal lane of the second port, amplifying a signal on the lane selected by the multiplexer in the input selector device, and transmitting the amplified signal to test and measurement instrument.

Example 20 is a method according to Example 19, further comprising storing calibration parameters of input selector device.

Example 21 is a method according to Example 20, further comprising removing an effect of the input selector device from any signal transmitted on the first signal lane and the second signal lane based on the calibration parameters.

Example 22 is a method according to any of the preceding Example methods, further comprising receiving a control signal to operate the multiplexer from the test and measurement instrument.

Example 23 is a method according to Example 22, further comprising generating the control signal as the output of a set of programming instructions.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that all features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure. Accordingly, the disclosure should not be limited except as by the appended claims.

We claim:

1. An input selector for electrically connecting one of a plurality of test signals from a device under test to a test and measurement instrument, each of the plurality of test signals coupled to the input selector through a path that includes a respective one of a plurality of input radio frequency (RF) cables, the input selector comprising:
    a multiplexer having multiple inputs, each of the multiple inputs coupled to a different one of the plurality of test signals from the device under test, and having an output of a selected one of the multiple inputs;
    an amplifier coupled to the output of the multiplexer for amplifying the selected test signal of the device under test before being sent as an output of the input selector to the test and measurement instrument; and
    a memory structured to store the de-embedding parameters that may be used to remove effects of the presence of the plurality of input RF cables.

2. The input selector of claim 1, in which the amplifier is a buffered amplifier that has an input impedance over 10,000 Ohms.

3. The input selector of claim 1, in which the amplifier is an amplifier having an input impedance of approximately 50 Ohms.

4. The input selector of claim 1, further comprising a processor configured to control the multiplexer.

5. The input selector of claim 1, further comprising an input configured to receive a control signal to operate the multiplexer.

6. The input selector of claim 5, in which the control signal is generated by programmatic control.

7. The input selector of claim 1, in which the output of the input selector is sent over an output RF cable to the test and measurement instrument.

8. The input selector of claim 1, in which the input selector is permanently attached to the test and measurement instrument through at least one direct signal test line.

9. The input selector of claim 1, in which the multiplexer has two or more outputs, and in which each of the two or more outputs is amplified before being sent as an output of the input selector to the test and measurement instrument.

10. The input selector of claim 1, in which the de-embedding parameters comprise parameters for the plurality of input RF cables and the multiplexer.

11. The input selector of claim 1, in which the memory is further structured to store scattering parameters of the plurality of input RF cables.

12. A method for connecting one or more signal lanes to a test and measurement instrument, comprising:
    connecting a first signal lane from a first port to an input of a multiplexer in an input selector device through a first input radio frequency (RF) cable;
    connecting a second signal lane from a second port to the input of a multiplexer in the input selector device through a second input radio frequency (RF) cable;
    operating the multiplexer to select either the first signal lane of the first port or the second signal lane of the second port;
    amplifying a signal on the lane selected by the multiplexer in the input selector device;

transmitting the amplified signal to test and measurement instrument; and storing de-embedding parameters of the first input RF cable and the second input RF cable in a memory of the input selector device that may be used to remove effects of the presence of the first and second input RF cables.

13. The method of claim 12, further comprising removing an effect of the input selector device from any signal transmitted on the first signal lane and the second signal lane based on the de-embedding parameters.

14. The method of claim 12, further comprising receiving a control signal to operate the multiplexer from the test and measurement instrument.

15. The method of claim 14, further comprising generating the control signal as the output of a set of programming instructions.

16. The method of claim 12, further comprising calibrating the de-embedding parameters of the first input RF cable and the second input RF cable prior to storing the de-embedding parameters in the memory of the input selector device.

17. The method of claim 12, further comprising storing scattering parameters in the memory of the input selector device.

18. An input selector for electrically connecting one of a plurality of test signals from a device under test to a test and measurement instrument, each of the plurality of test signals coupled to the input selector through a path that includes a respective one of a plurality of input radio frequency (RF) cables, the input selector comprising:

a multiplexer having multiple inputs, each of the multiple inputs having a connector and being coupled to a different one of the plurality of test signals from the device under test, and having an output of a selected one of the multiple inputs;

an amplifier coupled to the output of the multiplexer for amplifying the selected test signal of the device under test before being sent as an output of the input selector to the test and measurement instrument; and a memory structured to store the de-embedding parameters that may be used to remove effects of the presence of the plurality of input RF cables, and in which the memory is further structured to store scattering parameters of the plurality of input RF cables, the connectors of the multiplexer, and the multiplexer.

19. The input selector of claim 18, in which the memory is further structured to store a de-embedding parameter and a scattering parameter for an input port of the test and measurement instrument.

* * * * *